United States Patent
Bae et al.

(10) Patent No.: US 6,984,684 B2
(45) Date of Patent: Jan. 10, 2006

(54) STABILITY IMPROVEMENT OF ALUMINUM HYDROXIDE IN PVC COMPOUND

(75) Inventors: Kook Jin Bae, Kinnelon, NJ (US); Stuart D. Brilliant, Levittown, NY (US)

(73) Assignee: Crompton Corporation, Middlebury, CT (US)

( * ) Notice: Subject to any disclaimer, the term of this patent is extended or adjusted under 35 U.S.C. 154(b) by 30 days.

(21) Appl. No.: 10/724,374

(22) Filed: Nov. 26, 2003

(65) Prior Publication Data

US 2004/0107870 A1  Jun. 10, 2004

Related U.S. Application Data

(63) Continuation of application No. 10/035,129, filed on Jan. 4, 2002, now abandoned.

(51) Int. Cl.
*C08L 27/04* (2006.01)
*C08L 3/22* (2006.01)

(52) U.S. Cl. .................. 524/437; 524/567; 524/569; 524/436; 524/394; 524/400; 524/297; 524/298

(58) Field of Classification Search .......... 524/437, 524/436, 430, 424, 567, 569, 394, 400, 297
See application file for complete search history.

(56) References Cited

U.S. PATENT DOCUMENTS

| 4,464,495 | A | * | 8/1984 | Brown ..................... 524/87 |
| 4,659,764 | A | * | 4/1987 | Isao et al. ................ 524/399 |
| 5,004,776 | A | * | 4/1991 | Tadenuma et al. ........ 524/377 |
| 5,190,700 | A | * | 3/1993 | Watanabe et al. ......... 252/609 |
| 5,519,077 | A | * | 5/1996 | Drewes et al. ............ 524/114 |
| 5,744,525 | A | * | 4/1998 | Harvey et al. ............. 524/84 |
| 6,084,013 | A | * | 7/2000 | Wehner ..................... 524/100 |
| 6,245,846 | B1 | * | 6/2001 | Daniels et al. ............ 524/409 |
| 6,825,256 | B2 | * | 11/2004 | Bae et al. .................. 524/297 |

FOREIGN PATENT DOCUMENTS

| JP | 61-9451 A | * | 1/1986 |
| JP | 4-268355 A | * | 9/1992 |

OTHER PUBLICATIONS

JP 61-9451 (abstract in English).*
JP 4-268355 (abstract in English).*

* cited by examiner

*Primary Examiner*—David W. Wu
*Assistant Examiner*—Rip A. Lee
(74) *Attorney, Agent, or Firm*—Michael P. Dilworth

(57) ABSTRACT

An aluminum hydroxide composition is disclosed, having diminished tendency to cause discoloration on heating at 177° C. of a plastic composition whose major polymeric component is polyvinyl chloride, comprising aluminum hydroxide and an amount, effective in diminishing discoloration, of at least one inorganic perchlorate salt selected from the group consisting of alkali metal perchlorates and alkaline earth metal perchlorates.

10 Claims, No Drawings

STABILITY IMPROVEMENT OF ALUMINUM HYDROXIDE IN PVC COMPOUND

CROSS-REFERENCE TO RELATED APPLICATION(S)

This application is a continuation of U.S. patent application Ser. No. 10/035,129, filed Jan. 4, 2002, now abandoned.

BACKGROUND OF THE INVENTION

1. Field of the Invention

This invention relates to aluminum hydroxide having a diminished tendency to cause discoloration when compounded with a plastic composition at an elevated temperature, typically 180° C. In particular, the invention relates to aluminum hydroxide in a plastic composition in which the major polymeric component is a vinyl chloride polymer such as polyvinyl chloride, conveniently abbreviated pvc.

2. Description of the Related Art

For a review of the utilization of aluminum hydroxide as an additive and compounding ingredient in plastic compositions, particularly relating to the use of aluminum hydroxide as a flame retardant, reference can be made to Chapter 81 by Frank Malesky in "Handbook of Plastics Additives and Modifiers", J. Edenbaum, ed., (New York: Van Nostrand Reinhold 1992), pages 1071–1085.

The problem of imparting to pvc a sufficient heat processing stability at temperatures at which the polymer becomes sufficiently fluid or softened to permit shaping is of long standing. It has been resolved in principle by the addition to the polymer of various combinations of known heat stabilizers. Given the great versatility of plastic compositions in which pvc is the major polymeric component, however, the selection of the right stabilizer or stabilizer combination for any given composition remains an empirical art in which theories and predictions are of limited usefulness.

There exists a prodigiously large literature relating to stabilizers for pvc. For a convenient review and classification reference can be made to Chapters 16–20 in the above-cited "Handbook", pages 208–337.

The following individual disclosures are believed to represent the closest prior art to the present invention.

M. Tadenuma et al., U.S. Pat. No. 5,004,776 disclosed a thermally stabilized chlorine-containing resin composition comprising a stabilizer consisting essentially of (a) an overbased alkaline earth metal carboxylate or phenolate complex, (b) zeolite, (c) calcium hydroxide and (d) a complex of at least one metal perchlorate selected from the group consisting of sodium, magnesium, calcium and barium perchlorates with at least one compound selected from the group consisting of polyhydric alcohols and their derivatives. The chlorine-containing resin composition may further comprise a known stabilizer for chlorine-containing resins, a known co-stabilizer and other known additives, for example (among others) an inorganic metal salt compound. The inorganic compound includes, for example, magnesium oxide, calcium oxide, calcium phosphate, aluminum hydroxide, synthetic hydrotalcite and the like.

Y. Sato al., U.S. Pat. No. 5,025,051 disclosed a synthetic resin composition comprising (A) 100 parts by weight of a synthetic resin, and (B) 0.01 to 10 parts by weight of a mixed product of (a) a compound having at least one piperidyl group, (b) perchloric acid, and (c) optionally an inorganic substance other than perchloric acid. As the inorganic substance other than perchloric acid, there are d disclosed, for example, an oxide, hydroxide, inorganic acid salt, basic inorganic acid salt or double salt of at least one metal selected from the group consisting of Li, Na, K, Mg, C, Sr, Ba, Zn, Al, Sn and Pb, further a metallic aluminum powder, or a metal oxide such as $SnO_2$, $TiO_2$, or $ZrO_2$. As the oxide of the metal there are mentioned, for example, MgO, CaO, BaO, ZnO, $SrO_2$, or PbO, and as the hydroxide of said metal there are mentioned, for example, LiOH, Mg $(OH)_2$, Ca $(OH)_2$ or $Al(OH)_3$.

K. Bae et al., U.S. Pat. No. 5,034,443 disclosed that a blend of sodium perchlorate hydrate and calcium silicate provides improved long term heat stability to a polyvinyl chloride resin containing a conventional heat stabilizer, and that a combination of a solution of sodium perchlorate in water with calcium silicate and a non-absorbing diluent powder such as calcium carbonate provides a free-flowing powder composition of reduced hazard level. Other non-absorbing diluent powders include zeolites, silica, alumina, PVC resins, barium sulfate and the like.

Watanabe et al., U.S. Pat. No. 5,190,700 disclosed a flame retardant for a powder halogen-containing vinyl resin which comprises (A) 5 to 40 parts by weight of at least one alkali metal compound of lithium, sodium and potassium calculated as the formula $M_2O$ where M is said alkali metal (B) 0.2 to 10 parts by weight of a perchloric acid radical in the form of the acid or a salt or amine thereof, calculated as perchloric acid radical ($ClO_4$), and (C) 1–50 parts by weight of a hydrophobic dispersing agent having a boiling point or a decomposition temperature of 200° C. or higher, based on 100 parts by weight of antimony pentoxide ($Sb_2O_5$). Watanabe also acknowledges that a variety of flame retardants have been used, including inorganic materials such as antimony trioxide ($Sb_2O_3$), sodium antimonite, aluminum hydroxide, zirconium oxide, zinc borate and borax.

R. Drewes et al., U.S. Pat. Nos. 5,519,077 and 5,543,449 disclosed compositions comprising (a) pvc, (b) perchloric acid or a perchlorate, (c) a terminal epoxide compound and (d) an antioxidant ('077) and (a) flexible pvc, (b) perchloric acid or a perchlorate, (c) a terminal epoxide compound ('443). In each case it is also disclosed that the compositions can contain further additives. These are, for example, fillers and reinforcing materials (for example calcium carbonate, silicates, glass fibers, talc, kaolin, chalk, mica, metal oxides and hydroxides, carbon black or graphite). The fillers used are, for example, chalk, kaolin, china clay, talc, silicates, glass fibers, glass beads, sawdust, mica, metal oxides or hydroxides, carbon black, graphite, rock flour and barytes.

None of the above disclosures mention a tendency to discolor caused by aluminum hydroxide.

Thus, while the well established and successful conventional heat stabilizers provide effective stabilization to the substrate polymer composition whose major polymeric component is pvc at elevated heat processing temperatures during standard processing, they may not provide effective stabilization to additives contained within the polymer during such heat processing. For example, the use of aluminum hydroxide in such compositions is not without limitations. It has been found that one important limitation is the tendency of an otherwise adequately stabilized pvc composition to discolor in the presence of aluminum hydroxide, with the intensity of discoloration increasing with increasing use levels of aluminum hydroxide in such composition.

It is therefore a general object of the present invention to provide a plastic composition containing aluminum hydroxide having a diminished tendency to discolor at processing temperatures of the order of 180° C.

It is also an object of the invention to provide an aluminum hydroxide composition having a diminished tendency to discolor when incorporated in a plastic composition whose major polymeric component is pvc.

It is also an object of the invention to provide an aluminum hydroxide composition having enhanced flame retardant properties when incorporated in a plastic composition whose major polymeric component is pvc.

It is a further object of the invention to provide a method of stabilizing a plastic composition whose major polymeric component is pvc and which contains aluminum hydroxide.

SUMMARY OF THE INVENTION

In accordance with this invention, there is provided an aluminum hydroxide composition having diminished tendency to cause discoloration on heating at 177° C. of a plastic composition whose major polymeric component is polyvinyl chloride, comprising aluminum hydroxide and an amount, effective in diminishing discoloration, of at least one inorganic perchlorate salt selected from the group consisting of alkali metal perchlorates and alkaline earth metal perchlorates. The effective amount of the perchlorate salt ranges from 0.03 parts by weight to 3 parts by weight per 100 parts by weight of aluminum hydroxide.

Also in accordance with this invention, there is provided a plastic composition having diminished tendency to discolor on heating at 177° C. in the presence of aluminum hydroxide, comprising polyvinyl chloride, aluminum hydroxide, and an amount, effective in diminishing the tendency to discolor, of at least one inorganic perchlorate salt selected from the group consisting of alkali metal perchlorates and alkaline earth metal perchlorates. The amount of aluminum hydroxide is suitably a flame-retardant amount in the range from 15 parts by weight to 150 parts by weight per 100 parts by weight of polyvinyl chloride. The amount of the perchlorate salt s in the range from 0.03 parts by weight to 3 parts by weight per 100 parts by weight of aluminum hydroxide.

Moreover, in accordance with this invention, there is provided a masterbatch composition adapted for safe storage, transport, and simplified compounding with a plastic composition whose major polymeric component is polyvinyl chloride, comprising aluminum hydroxide and at least one inorganic perchlorate salt selected from the group consisting of alkali metal perchlorates and alkaline earth metal perchlorates. The masterbatch according to the invention can contain from 7 parts by weight to 500 parts by weight of the perchlorate salt, calculated on a dry basis, per 100 parts by weight of aluminum hydroxide. The masterbatch according to the invention can additionally include water, calcium silicate, and inert inorganic diluent powder as required.

A masterbatch according to the invention simplifies the compounding of an aluminum hydroxide containing plastic composition whose major polymeric component is polyvinyl chloride with the effective amount of perchlorate salt required according to the invention by substituting for it a more proportionate quantity of a more easily handled and transported masterbatch as defined, along with additional aluminum hydroxide and other compounding ingredients as required.

Also provided in accordance with this invention is an insulated electrical conductor comprising a metallic conductor, a first insulating layer comprising flexible polyvinyl chloride surrounding the conductor, and a second layer surrounding the first insulating layer as a plenum or jacket. The second layer comprises polyvinyl chloride, a sufficient quantity of plasticizer to impart flexibility to the composition, aluminum hydroxide, and an amount, effective in diminishing the tendency to discolor, of at least one inorganic perchlorate salt selected from the group consisting of alkali metal perchlorates and alkaline earth metal perchlorates. The amount of aluminum hydroxide is suitably a flame-retardant amount in the range from 15 parts by weight to 150 parts by weight per 100 parts by weight of polyvinyl chloride. The amount of the perchlorate salt s in the range from 0.03 parts by weight to 3 parts by weight per 100 parts by weight of aluminum hydroxide.

Surprisingly, it has been found that the flame retardance of pvc compositions according to the invention comprising a flame retardant amount of aluminum hydroxide is enhanced in comparison to similar compositions not including an effective amount of such inorganic perchlorate salt. The flame-retardant amount is in the range from 15 to 150 parts by weight of aluminum hydroxide per 100 parts by weight of pvc.

DETAILED DESCRIPTION OF THE INVENTION

Throughout this specification and the accompanying claims, the term polyvinyl chloride and its abbreviation pvc are used to refer to vinyl chloride polymers in general, including vinyl chloride homopolymer; copolymers of vinyl chloride as the major monomer with minor amounts of one or more unsaturated monomers such as vinyl acetate, vinylidene chloride, vinyl alkyl ethers, ethylene, propylene, dialkyl maleates and acrylonitrile; and blends of a vinyl chloride polymer with equal or lesser amounts of polymeric modifiers such as acrylic and methacrylic ester polymers, butadiene polymers, styrene polymers, acrylonitrile polymers, and copolymers of two or more of the here indicated monomers, chlorinated polyethylene and chlorinated vinyl chloride polymers. Additional representatives of the class of polymer materials to which the term polyvinyl chloride is here applied are disclosed by Wehner et al., U.S. Pat. No. 6,194,494 B1, at column 44 line 29 to column 45 line 16, which disclosure is here incorporated by reference.

The alkali metal and alkaline earth metal perchlorates used according to this invention include barium perchlorate, calcium perchlorate, lithium perchlorate, magnesium perchlorate, potassium perchlorate, sodium perchlorate, and strontium perchlorate. Anhydrous solid forms, hydrated solid forms, and aqueous solutions of these perchlorate salts can be used according to the invention. Sodium perchlorate is preferred. Sodium perchlorate monohydrate is particularly preferred.

PVC used according to this invention can be rigid or flexible. Flexible PVC is preferred. Flexibility is imparted to PVC as known in the art by such techniques as limiting thickness of unmodified vinyl chloride homopolymer to 0.05 mm or less, by copolymerization of vinyl chloride with 10–20% of such comonomers as vinyl acetate (so-called internal plasticization), and particularly by compounding with compatible liquids known as plasticizers. Many suitable plasticizers are known in the art, including in particular the esters of dicarboxylic and tricarboxylic acids such as adipic, citric, phthalic and trimellitic acids with alcohols having 6–12 carbon atoms, preferably dialkyl phthalates and trialkyl trimellitates having 7 to 11 carbon atoms in the alkyl groups. Additional representatives of the class of suitable plasticizers are disclosed by Wehner et al., U.S. Pat. No. 6,194,494 B1 at column 37 line 36 to column 38 line 51, which disclosure is here incorporated by reference. Use levels of plasticizers when present can range from 5 parts by weight to 125 parts by weight per 100 parts of pvc.

PVC compositions according to this invention usually contain at least one heat stabilizer. In principle, any known heat stabilizer can be used. Preference is usually given to environmentally acceptable stabilizers from which such toxic heavy metals as arsenic, cadmium, lead, and thallium are substantially excluded. Particularly preferred metal containing heat stabilizers are barium, calcium, magnesium, strontium, and zinc salts of aliphatic and aromatic non-nitrogenous monocarboxylic acids having 6 to 24 carbon atoms. Particularly preferred non-metallic heat stabilizers are aliphatic and aromatic phosphites, substituted phenols having a molecular weight of at least 200 daltons, ethers and esters having epoxide groups and molecular weight of at least 200 daltons and 1,3-dicarbonyl compounds having molecular weight of at least 200 daltons. Additional categories of suitable heat stabilizers are disclosed by Wehner et al., U.S. Pat. No. 6,194,494 B1, at column 1 line 4 to column 2 line 5, and many individual representatives of these categories are disclosed at column 2 line 46 to column 37 line 25 and column 39 line 8 to column 42 line 27. These disclosures are here incorporated by reference. Use levels of heat stabilizers when present can range from 0.01 to 10 parts by weight per 100 parts of pvc. Larger amounts can be used but are seldom required.

Conventional lubricants, flame retardants, colorants, fillers and other compounding ingredients and additives can be included in the composition of the invention as required. For a compilation of such materials, reference can be had to Wehner et al., U.S. Pat. No. 6,194,494 B1, at column 37 lines 26–35, column 38 line 52 to column 39 line 7, which disclosure is here incorporated by reference.

The following examples are offered by way of illustration and not of limitation of the invention as defined by the appended claims.

EXAMPLES 1–5

The effectiveness of compositions of the invention was observed in a typical plenum wire compound formulation, that is a formulation of a flexible flame retardant outer sheath or plenum for a wire or other metallic conductor surrounded by a layer of primary insulation and further surrounded by the outer sheath or plenum. All quantities are given in parts by weight.

Thus, the typical plenum wire compound base formulation contained

| PVC resin | 100.0 |
|---|---|
| Phthalate ester plasticizer | 50.0 |
| Omya F brand of calcium carbonate | 12.0 |
| Antimony trioxide second flame retardant | 5.0 |
| Stearic acid | 0.25 |
| Ba/Zn solid stabilizer | 8.0 |
| ATH aluminum hydroxide | 50.0 |

Various amounts of 60% Na perchlorate monohydrate aqueous solution (abbreviated NaP-60) were blended with this base formulation using a two roll mill, as shown below for each Example, and samples cut from each milled sheet were tested for static oven stability at two temperatures, 350° F. (177° C.) sampled at 15 minute intervals and 375° F. (190° C.) sampled at 10 minute intervals.

| EXAMPLE | Control A | 1 | 2 | 3 | 4 | 5 |
|---|---|---|---|---|---|---|
| NaP-60 parts actual | none | 0.5 | 1.0 | 1.5 | 2.0 | 3.0 |
| NaP-60 parts/100 ATH | none | 1.0 | 2.0 | 3.0 | 4.0 | 6.0 |
| As dry NaClO$_4$ per 100 ATH | none | 0.48 | 0.96 | 1.44 | 1.92 | 2.88 |

The Control A PVC compound without perchlorate initially discolored to brown in 90 minutes at 177° C. and 40 minutes at 190° C. and turned to dark brown in 105 minutes at 177° C. and in 50 minutes at 190° C., but with perchlorate treated ATH, the test compound color change was much less.

At 177° C. oven test, the color change of Examples 1–5 is minimal (no sign of brown color in 120 minutes) and at 190° C. the Examples 1–5 compounds containing the perchlorate and ATH shows improved long term stability compared to Control A. Also the perchlorate containing ATH had improved flame and smoke properties of plenum compounds over that using ATH without perchlorate.

EXAMPLES 6–12

The effectiveness of the composition of the invention was observed in a similar plenum base formulation with varied levels of sodium perchlorate monohydrate supplied in two different physical forms.

| PVC resin | 100.0 |
|---|---|
| Dialkyl phthalate plasticizer | 47.0 |
| Omya F brand of calcium carbonate | 12.0 |
| Antimony trioxide second flame retardant | 8.0 |
| Stearic acid | 0.3 |
| Ba/Zn solid stabilizer | 6.0 |
| ATH aluminum hydroxide | 60 |
| Powder blend containing NaClO$_4$ (note) | variable |
| NaP-60 aqueous solution | variable |

(note):
a composition of Bae et al., U.S. Pat. No. 5,034,443 containing 33% by weight of 60% aqueous sodium perchlorate monohydrate solution The amounts of ATH aluminum hydroxide and NaP-60 sodium perchlorate monohydrate solution blended with each Example formulation and tested for static oven heat stability at 350° F. (177° C.) and 400° F. (205° C.) are shown below:

| EXAMPLE | Control B | 6 | 7 | 8 | 9 |
|---|---|---|---|---|---|
| Powder blend actual | none | 0.25 | 0.5 | 1.0 | 2.0 |
| As NaP-60 parts solution | none | 0.083 | 0.167 | 0.33 | 0.67 |
| As NaP-60 parts/100 ATH | none | 0.167 | 0.33 | 0.67 | 1.33 |
| As dry NaClO$_4$ per 100 ATH | none | 0.08 | 0.16 | 0.32 | 0.64 |

| EXAMPLE | 10 | 11 | 12 |
|---|---|---|---|
| NaP-60 parts solution actual | 0.15 | 0.3 | 0.6 |
| As NaP-60 parts/100 ATH | 0.3 | 0.6 | 1.2 |
| As dry NaClO$_4$ per 100 ATH | 0.144 | 0.288 | 0.51 |

The Control B PVC compound without perchlorate initially discolored to brown in 90 minutes at 177° C. and 20 minutes at 205° C. and turned to dark brown in 105 minutes at 177° C. and in 25 minutes at 205° C.

Addition of perchlorate substantially prevented brown discoloration of Examples 6 to 105 minutes at 177° C. and for the entire 120 minute test period at that temperature in Examples 7–12. In the test at 205° C. as little as 0.083 parts of the sodium perchlorate monohydrate solution (contained in 0.25 parts of the powder blend used in Example 6) was effective in delaying brown discoloration, and increasing perchlorate levels were increasingly effective.

EXAMPLES 13–15

The effectiveness of the composition of the invention was observed in the plenum base formulation of Examples 6–12 with varied levels of aluminum hydroxide.

| | |
|---|---|
| PVC resin | 100.0 |
| Phthalate plasticizer | 47.0 |
| Omya F brand of calcium carbonate | 12.0 |
| Antimony trioxide second flame retardant | 8.0 |
| Stearic acid | 0.3 |
| Ba/Zn solid stabilizer | 6.0 |
| ATH aluminum hydroxide | variable |
| Powder blend containing NaClO$_4$ (note) | variable |

(note):
a composition of Bae et al., U.S. Pat. No. 5,034,443 containing 33% by weight of 60% aqueous sodium perchlorate monohydrate solution The amounts of ATH aluminum hydroxide, the above powder blend containing NaP-60 sodium perchlorate monohydrate solution and the resulting amount of sodium perchlorate contained in each Example formulation and tested for static oven heat stability at 350° F. (177° C.) and 400° F. (205° C.) are shown below:

| EXAMPLE | Control C | Control D | Control E | Control F | Control G |
|---|---|---|---|---|---|
| ATH aluminum hydroxide | none | none | 10 | 20 | 40 |
| Powder blend actual | 0.5 | none | none | none | none |
| As NaP-60 parts solution | 0.167 | none | none | none | none |
| As NaP-60 parts/100 ATH | N/A | none | none | none | none |
| As dry NaClO$_4$ per 100 ATH | N/A | none | none | none | none |

| EXAMPLE | Control H | 13 | 14 | 15 |
|---|---|---|---|---|
| ATH aluminum hydroxide | 60 | 10 | 20 | 60 |
| Powder blend actual | none | 0.5 | 0.5 | 0.5 |
| As NaP-60 parts solution | none | 0.167 | 0.167 | 0.167 |
| As NaP-60 parts/100 ATH | none | 1.67 | 0.83 | 0.28 |
| As dry NaClO$_4$ per 100 ATH | none | 0.80 | 0.40 | 0.13 |

The Control C and Control D compounds represent a comparison that measures the stabilizing effectiveness of sodium perchlorate in the absence of aluminum hydroxide. Both Control C and Control D also contain the same amount of barium-zinc stabilizer. It can be seen that there is a certain favorable effect of the sodium perchlorate in Control C. Control C showed the first sign of brown discoloration at 105 minutes at 177° C. and at 15 minutes at 205° C., while Control D showed the first sign of brown discoloration at 90 minutes at 177° C. and at 10 minutes at 205° C. Control C also turned to dark brown at 30 minutes at 205° C. while Control D turned to dark brown at 20 minutes at 205° C.

Controls D, E, F, G and H represent a comparison that measures the effect of increasing levels of aluminum hydroxide from zero to 10, 20, 40, and 60 parts per 100 parts of pvc.

The results show that the first sign of brown discoloration as well as turning dark brown occur progressively earlier as the use level of aluminum hydroxide is increased. It is seen, therefore, that aluminum hydroxide represents a problem in stabilization over and above the stabilization of pvc.

Surprisingly, the use of perchlorate in Examples 13–15 presented an entirely different trend. Thus the addition of 0.5 part of powder blend, representing 0.167 parts of 60% sodium perchlorate monohydrate solution substantially prevented brown discoloration of Examples 13 to 15 for the entire 120 minute test period at 177° C. In the test at 205° C. 0.167 parts of the sodium perchlorate monohydrate solution (contained in 0.5 parts of the powder blend) was effective in delaying the first sign of brown discoloration of the samples containing aluminum hydroxide to 25 minutes, longer than 15 minutes in the absence of aluminum hydroxide (compare Control C and Example 15 both having the same perchlorate level and the most extreme difference in use level of aluminum hydroxide, i.e. 0 compared to 60 parts per 100 pvc).

Thus the stability problem with aluminum hydroxide in pvc is counteracted and even reversed by the addition of sodium perchlorate in accordance with the invention.

What is claimed is:

1. A plastic composition having diminished tendency to discolor on heating at 177° C. in the presence of aluminum hydroxide, comprising polyvinyl chloride, from 15 parts by weight to 150 parts by weight aluminum hydroxide per 100 parts by weight of polyvinyl chloride, and an amount, effective in diminishing said tendency to discolor, of at least one inorganic perchlorate salt selected from the group consisting of alkali metal perchlorates.

2. The composition of claim 1, wherein the amount of said inorganic perchlorate is in the range from 0.03 parts by weight to 3 parts by weight per 100 parts by weight of aluminum hydroxide.

3. The composition of claim 1, wherein said inorganic perchlorate is sodium perchlorate.

4. The composition of claim 1, additionally comprising at least one plasticizer.

5. The composition of claim 4, wherein said at least one plasticizer is selected from the group consisting of dialkyl phthalates and trialkyl trimellitates having independently in each alkyl group seven to eleven carbon atoms.

6. The composition of claim 1, additionally comprising at least one heat stabilizer.

7. The composition of claim 6, wherein said at least one heat stabilizer is a barium, calcium, magnesium, strontium, or zinc salt of a non-nitrogenous monocarboxylic acid having 6–24 carbon atoms.

8. In a plastic composition whose major polymeric constituent is polyvinyl chloride, the improvement comprising the inclusion therein of:
(A) from 15 parts by weight to 150 parts by weight aluminum hydroxide per 100 parts by weight of polyvinyl chloride; and
(B) an amount, effective in diminishing discoloration of said composition upon heating at 177° C., of at least one inorganic perchlorate salt selected from the group consisting of alkali metal perchlorates.

9. The plastic composition of claim 8 wherein the inorganic perchlorate salt is present in the range of from 0.03 part by weight to 3 parts by weight per 100 parts by weight of the aluminum hydroxide.

10. The plastic composition of claim 9 wherein the alkali metal perchlorate is sodium perchlorate.

* * * * *